(12) United States Patent
Carter (10) Patent No.: US 11,562,008 B2
(45) Date of Patent: Jan. 24, 2023

(54) DETECTION OF ENTITIES IN UNSTRUCTURED DATA

(71) Applicant: Hewlett Packard Enterprise Development LP, Houston, TX (US)

(72) Inventor: Samuel Roy Carter, Pleasanton, CA (US)

(73) Assignee: MICRO FOCUS LLC, Sanford, NC (US)

( * ) Notice: Subject to any disclaimer, the term of this patent is extended or adjusted under 35 U.S.C. 154(b) by 532 days.

(21) Appl. No.: 15/334,009

(22) Filed: Oct. 25, 2016

(65) Prior Publication Data

US 2018/0113931 A1 Apr. 26, 2018

(51) Int. Cl.
*G06F 16/31* (2019.01)

(52) U.S. Cl.
CPC .................... *G06F 16/313* (2019.01)

(58) Field of Classification Search
CPC ...................................... G06F 16/313
See application file for complete search history.

(56) References Cited

U.S. PATENT DOCUMENTS

| | | | |
|---|---|---|---|
| 7,788,293 B2 | 8/2010 | Pasztor et al. | |
| 7,849,049 B2 | 12/2010 | Langseth et al. | |
| 8,229,883 B2 | 7/2012 | Brauer et al. | |
| 8,489,530 B2 | 7/2013 | De et al. | |
| 9,251,182 B2 | 2/2016 | Deshpande et al. | |
| 9,275,132 B2 | 3/2016 | Roberts et al. | |
| 9,443,007 B2 | 9/2016 | Donneau-Golencer et al. | |
| 2003/0171910 A1* | 9/2003 | Abir | G06F 17/2809 704/1 |
| 2005/0131935 A1 | 6/2005 | O'Leary et al. | |
| 2007/0230787 A1* | 10/2007 | Belitskaya | G06K 9/723 382/182 |
| 2010/0030715 A1* | 2/2010 | Eustice | G06Q 10/10 706/12 |
| 2014/0046921 A1* | 2/2014 | Bau | G06F 16/951 707/706 |

OTHER PUBLICATIONS

Wang, D.Z., "Extracting and Querying Probabilistic Information In BayeSstore", Electrical Engineering and Computer Sciences, University of California at Berkeley, (Research Paper), Dec. 13, 2011, 157 pages.

* cited by examiner

*Primary Examiner* — Charles D Adams (57) ABSTRACT

Examples herein involve detection of entities in unstructured data. Terms are extracted from unstructured data. Entities scores for the terms are calculated using information from a name probability source, a known entity database, and historical context information. The entity scores indicate a probability that the respective terms refer to entities. The presence of detected entities are indicated based on the entity scores.

20 Claims, 5 Drawing Sheets

DETECTION OF ENTITIES IN UNSTRUCTURED DATA

BACKGROUND

Unstructured data includes text (e.g., documents, messages, emails, webpages, etc.), audio recordings, video recordings, images, etc. of content. Unstructured data may refer to data that does not follow a fixed data model or schema. For instance, unstructured data may not be stored in a particular fixed location as set forth by the data model. In that regard, unstructured data may refer to free form text or data that is not stored in a predetermined field of a data file. For example, text of an email or document may be considered unstructured in that it includes a plurality of words, numbers, identifiers and another text without expressly identifying the type of data in the e-mail or document whereas tables or indices may be considered structured data indicating the content, purpose, and relationship of the data in the tables or indices.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve detecting entities within a corpus of unstructured data. In examples herein, entity scores are assigned and adjusted to terms extracted from the unstructured data based on probabilities that the terms refer or correspond to an entity. Examples herein enable entities of interest for a particular matter (e.g., an event, an association, an organization, etc.) to be identified within the corpus of unstructured data.

Analyzing and detecting information within unstructured data may be a manageable task when entities are known and/or have characteristics that are detectable or and/or included in a structured data format. For example, known entities may be mapped to metadata, such as email addresses, login account names/identifiers to known entities, etc. that is indicated in the structured data. However, in many instances an entity (e.g., a person, group, business, object, product, brand, etc.) may be referred to within unstructured data without using an explicit or known identifier for the entity. For example, John Doe's performance review may be discussed in the text of an email despite John Doe not being the sender or receiver (accordingly, John Doe may not be discoverable in that text using the metadata of the email). In some examples, a nickname, abbreviated name, phone number, account number, or any other characteristics or identifier of the entity may be used to identify an individual within unstructured data without necessarily previously knowing that the entity exists or that its corresponding identifier previously exists. In some examples, combinations of the characteristics may be used to identify an entity (e.g., name or nickname plus department name, position title, manager name, etc.). Furthermore, in some examples, an entity may exist within unstructured data that is not previously known or represented within an entity detection system. Examples herein enable identification of such unknown entities and/or an ability to relate the identified unknown entities to previously known entities.

Additionally, in many instances, there may be challenges involved with detecting entities in unstructured data represented by identifiers that crossover between names and numbers. For example, a name (e.g., of people, products, or businesses) may be confused with an ordinary word (e.g., the name "Bob" and the work "bob," the name "Frank" and the word "frank," the name "Apple" and the word "apple," etc.). Additionally, a phone number may not necessarily be distinguishable from an account number or employee number (e.g., a 7 or 10 digit number may not necessarily be a phone number). Furthermore, phone number formats may vary among regions of the world, so a phone number in one nation may appear as an account number in another. These challenges exponentially increase as the amount of unstructured data increases. Examples herein address these challenges and enable identification of known and unknown entities using a probabilistic approach to determining whether terms are representative of entities using a name probability source, a known entity database, and historical context information.

An example method includes extracting terms from a corpus of unstructured data and calculating an entity score for each of the terms. The entity score may indicate that the respective term refers to an entity of interest and is calculated from information of a name probability source, a known entity database, and a historical context information. In examples herein, the presence of the entities of interest detected in the corpus of unstructured data may be indicated based on the entity score for each of the terms.

As used herein, an entity may be any person, group, business, product, brand, date, number (or string of numbers), or other object that is capable of being identified by a particular name, number, identifier, etc. As used herein in, an entity exists (or is detected) in or within a corpus of documents, when a term or phrase exists (or is detected) that refers to the entity in or within the corpus of documents. As used herein, an entity of interest may refer to any person, group, business, product, brand, or other object that is associated with a particular matter (e.g., an event, an organization, an association, a person, etc.). As used herein, a term (e.g., a term extracted from unstructured data) may be any word, phrase, number, group of numbers, hashtag, or identifier that may be identified in a corpus of data.

Figure 1:
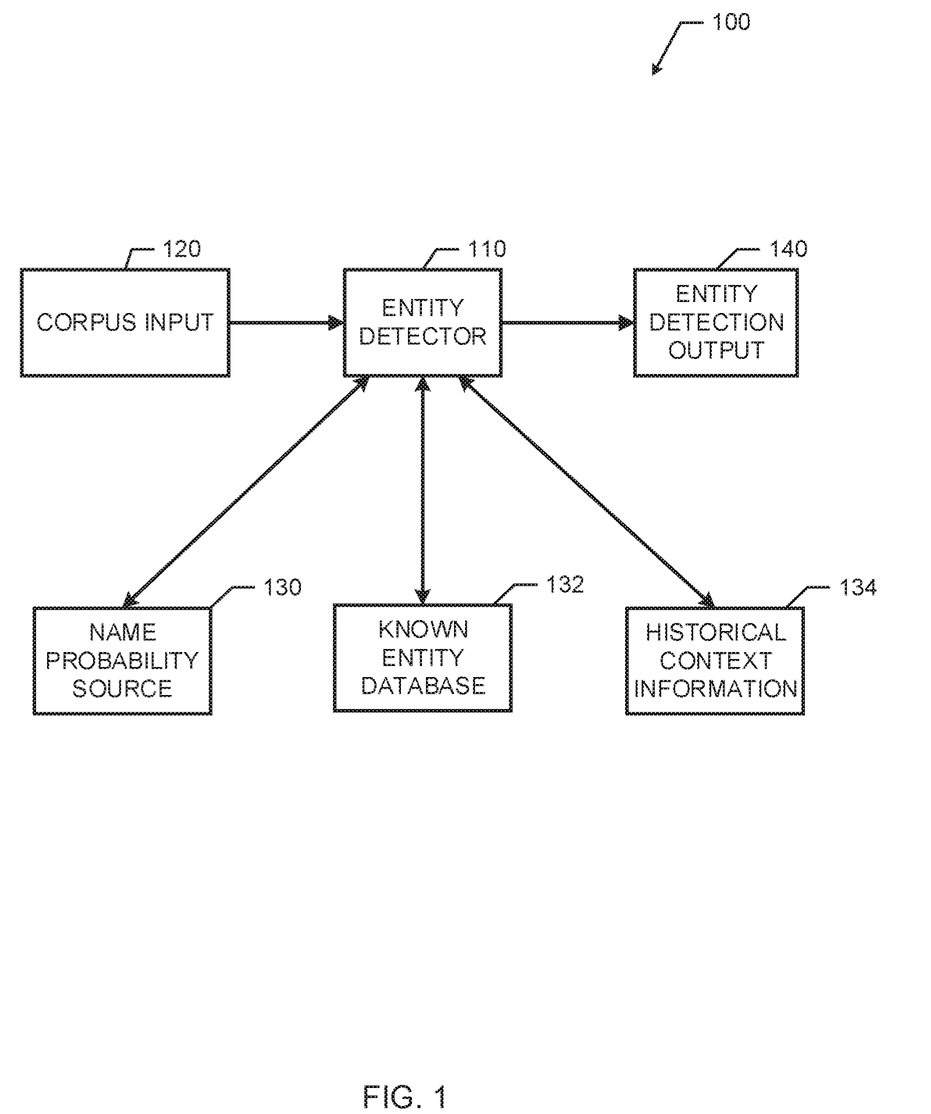
FIG. 1 is a block diagram of an example entity detection system including an entity detector constructed in accordance with an aspect of this disclosure.

FIG. 1 is a block diagram of an entity detection system 100 including an entity detector 110 constructed in accordance with examples herein. The example entity detection system 100 may be any processor platform (e.g., see FIG. 5), such as a computer, a server, a mobile device, or any other type of computing device. The example entity detection system 100 includes the entity detector 110, a corpus input 120, a name probability source 130, a known entity database 132, historical context information 134, and an entity detection output 140. In the example of FIG. 1, the entity detector 110 receives a corpus input 120 and communicates with the probability name source 130, the known entity database 132, and the historical context information 134, to detect entities in a corpus of unstructured data in the corpus input 120 and provide the entity detection output 140 indicating the presence of the detected entities.

The example corpus input 120 of FIG. 1 is provided to the entity detector 110 for analysis to detect the presence of entities or entities of interest within unstructured data of the corpus input 120. The corpus input 120 may be any corpus of data including unstructured data associated with a particular matter (e.g., an event, an organization, an association, a person, etc.) that is to be analyzed in accordance with examples herein. The example corpus input 120 may include unstructured data in any format, such as text, audio, video, image, etc. In some examples, the corpus input 120 and/or the entity detector 110 may preprocess unstructured data to a particular format for analysis (e.g., by performing speech to text, optical character recognition, etc.) by the entity detector 110 to detect the presence (or mention) of entities within the unstructured data. For example, in a legal environment, a corpus of unstructured data may include a corpus of unstructured evidence, such as text documents (e.g., emails, data files, instant messages, work product/office documents, etc.), images, audio files, video files, etc. associated with a particular legal matter. The unstructured evidence may be provided as the corpus input 120 to the entity detector 110 to detect and identify entities or entities of interest within the unstructured evidence that are to be investigated as suspects or accomplices and/or questioned as witnesses for a particular legal matter. This legal example may be referred to herein as an example implementation of the entity detection system 100 and/or the entity detector 110, however other implementations for detection of entities may be employed. For example, the entity detector 110 may be used in surveillance of an institution, such as a financial institution to detect rogue trading, insider leaks of research, etc. In some examples, the entity detector 110 may be used in project management, medical records management, governmental records management, etc, for detection and/or monitoring of entities within the records.

The example name probability source 130 of FIG. 1 may be any public information source of names and/or words. For example, the name probability source 130 may include an electronic dictionary, a census database, a name database (or regional name database), an identification database (e.g., a stock ticker with abbreviations for financial institutions, etc.) that may be accessible via a network and/or online website. In examples herein, statistics may be extracted from and/or provided by the name probability source 130. The example statistics may indicate a frequency that a name exists in a particular region or location or probability that a term refers to a name or a non-name word. For example, Frank may be a more common English word than Jade, but this may be different in a Chinese language. Accordingly, the name probability source may indicate or store a frequency that terms of the corpus input 120 refer to a name or a frequency that the terms refer to a non-name. The example entity detector 110 may use such information to determine or estimate a probability that a term in unstructured data of the corpus input 120 is representative or associated with an entity.

The known entity database 132 in the example of FIG. 1 may be a database with references (e.g., identifiers) of known entities that are known to be associated or included within the unstructured data of the corpus input 120 or associated with a particular matter of the corpus input 120. For example, the known entity database 132 may be a structured database including organized entity information and/or entities identifiers, such as a company directory (with entity names, entity phone numbers, entity employee numbers, entity addresses/locations, etc.), an organizational chart, a customer database, a product database, human resources information (e.g., annual reports), etc. The known entity database 132 may include characteristics or entity identifiers of known entities that may not exist within the name probability source 130, such as an entity name, entity location, entity phone number, entity address, entity position or title, entity relationship with other entities (e.g., manager/report relationship, mentor/mentee relationship, etc.). Furthermore, statistics may be gathered from the known entity database (e.g., the number of Frank's that work for a company, the number of people working at a particular location, etc.). The example entity detector 110 may use such information from the known entity database 132 to estimate and/or adjust a probability (e.g., using weighting) that a term in the unstructured data of the corpus input 120 is an entity of interest or not an entity of interest.

The example historical context information 134 of FIG. 1 is a set of information associated with a particular matter of the unstructured data of the corpus input 120 and/or associated with known entities of the known entity database 132. For example, the historical context information 134 may include a database or set of records including information on the data of the corpus input 120 or information on known entities of the known entity database 132. In some examples, the historical context information 134 may include known nicknames of entities, thus providing variations of names (e.g., Ken or Kenny for Kenneth, Alex or Sasha for Alexander, etc.). For example, messages (e.g., emails, instant messages, text messages, etc.) of the historical context information 134 may be analyzed to determine whether greetings or signatures of a message include a nickname (e.g., "Dear Sasha", or "Regards, Sasha", etc.) associated with the sender and/or receiver of the message. Furthermore, uncommon nicknames may be detectable (such as Trey or Trip for John Doe III, or an Anglicization like Chris for the Polish name of Krzysztof) from the historical context information 134 and used in the probability calculation of the entity detector 110 that a particular term refers to an entity of interest. In some examples, the historical context information 134 may include other information from communications or messages, such as an indication of associations of terms. For example, traffic analysis of messages (whether those within the corpus input 120 or those associated with messages of the corpus input 120) can provide a social graph of communications between individuals indicating relationships among entities of interest (e.g., similar to a structured organization chart found in the known entity database 132). Accordingly, the historical context information 134 may be used to estimate and/or adjust a probability (e.g., using weighting) that a term in the unstructured data of the corpus input 120 is an entity of interest or not an entity of interest. For example, the probabilities may be combined using a Bayesian theorem or any other similar probability formula.

The example entity detector 110 provides the entity detection output 140 that indicates the presence of entities within the corpus input 120 using the information from the name probability source 130, the known entity database 132, and the historical context information 134. In examples herein, the entity detection output 140 may be a list of detected entities organized in any suitable manner (e.g., chronologically, alphabetically, etc.). In some examples, the entity detection output 140 may be a graph of identified entities of interest that indicates a relationship or estimated relationship between the entities. The example entity detection output 140 may be provided as data (e.g., within a data file, text document, image, video, audio recording, etc.) and/or provided via any suitable output device (e.g., a light emitting diode (LED) display, an organic light emitting diode (OLED) display, a liquid crystal display, a cathode ray tube display (CRT), a touchscreen, a tactile output device, a light emitting diode (LED), a printer and/or speakers).

Figure 2:
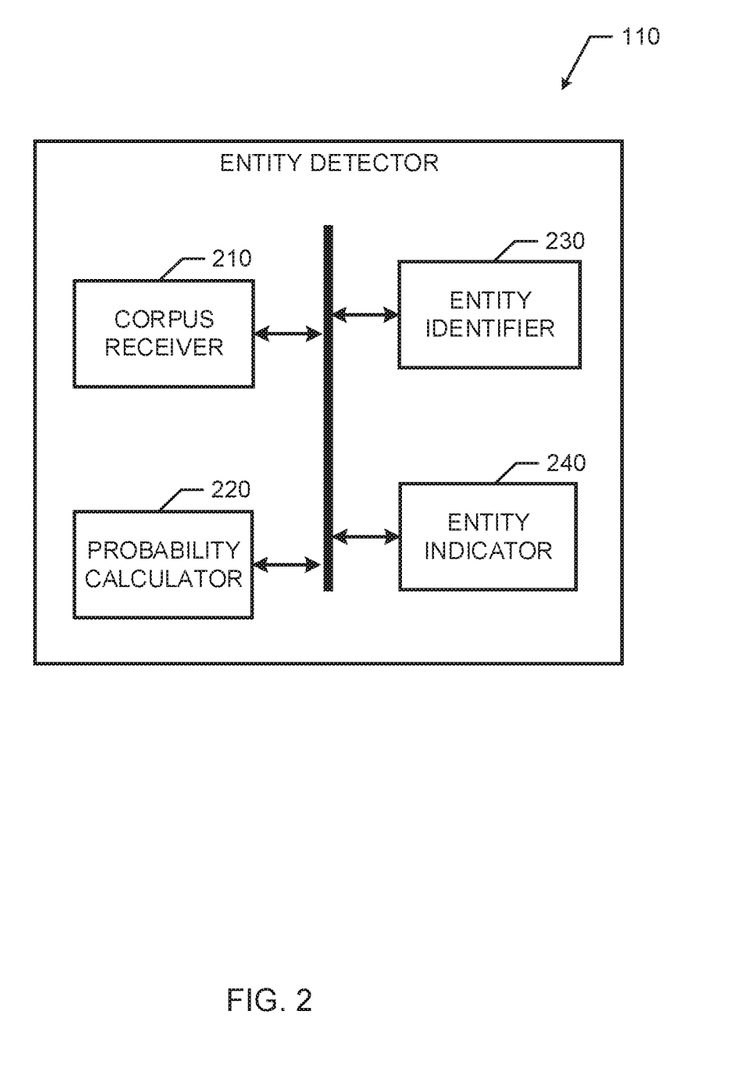
FIG. 2 is a block diagram of an example entity detector that may be used to implement the entity detector of FIG. 1.

FIG. 2 is a block diagram of an example entity detector 110 that may be used to implement the entity detector 110 of FIG. 1. The example entity detector 110 of FIG. 2 includes a corpus receiver 210, a probability calculator 220, an entity identifier 230, and an entity indicator 240. In examples herein, the corpus receiver 210 receives the data of the corpus input 120, the probability calculator 220 calculates a probability that terms of unstructured data of the corpus input 120 refer to entities of interest, the entity identifier 230 identifies entities of interest in the corpus receiver based on the probabilities, and the entity indicator 240 indicates the entities as the entity detection output 140.

The example corpus receiver 210 of FIG. 2 receives the corpus input 120 (e.g., a corpus of unstructured data) to be analyzed by the entity detector 110 in accordance with examples herein. In some examples, the corpus receiver 210 may preprocess the corpus input 120 to identify terms in unstructured data of the corpus input 120. For example, the corpus receiver 210 may parse text documents to identify terms, perform a speech to text conversion of audio or video files to identify terms, perform an optical character recognition (OCR) of an image or video to identify terms, or any other suitable preprocessing technique to identify terms in the unstructured data. Accordingly, the corpus receiver 210 may extract terms from unstructured data of the corpus input 120 to enable the entity detector 110 to determine whether the terms refer to entities of interest in accordance with examples herein.

The example probability calculator 220 calculates an entity score for terms of the corpus input 120 based on a probability that terms extracted from unstructured data of the corpus input 120 refer to an entity or entity of interest (whether previously known or unknown). The example entity score is a probability calculation that appropriately weights information from the name probability source 130, the known entity database 132, and the historical context information 134 to determine an entity score (e.g., a probability) that a term is an entity or entity of interest. In examples herein, an entity or entity of interest may not be a specified entity or previously known to exist entity within the corpus input 120. In some examples, the probability calculator 220 may calculate the entity score for each individual term identified or extracted by the corpus receiver 210 indicating that that respective term represents or refers to an individual. In some examples, particular terms or phrases extracted by the corpus receiver 210 may be ignored (e.g., words or numbers known not to refer to an entity).

The example probability calculator 220 uses information from the name probability source 130, the known entity database 132, and the historical context information 134. In some examples, the probability calculator 220 may iteratively assign and update entity scores (e.g., using a Bayesian calculation) to terms extracted from unstructured data of the corpus input 120. For example, the probability calculator 220, for each term identified by the corpus receiver 210, may assign an initial entity score for the term based on the name probability source 130. The probability calculator 220 may assign the initial entity score using statistics calculated from frequency of use in a language (e.g., for every 10,000 people in the United States, there are five people named Frank, or, on average, frank is used in one out of every 50,000 sentences in the United States, indicating that Frank is more likely a name than a word in this instance). The probability calculator 220 may then update that entity score based on information in the known entity database 132 using a Bayesian theorem. For example, the probability calculator 220 may combine the assigned probability with another probability calculated from the known entity database 132 (e.g., there are 5 Franks that work for a company that has 10,000 people, indicating the term refers to an entity known as Frank). And finally, the probability calculator 220 further updates that entity score for the term based on the historical context information 134. For example, the probability calculator 220 may combine the probabilities from the name probability source 130 and the known entity database 132 with another probability calculated from the information in the historical context information 134 (e.g., Frank was mentioned in a plurality of emails in the corpus input 120 around the time of a matter under investigation, indicating an increased probability that the term refers to an entity known as Frank). The probability calculator 220 may apply weights to probabilities determined from information in the probability name source 130, the known entity database 132, and the historical context information 134 to determine the probability that each analyzed term applies to an entity or an entity of interest.

In some examples, the probability calculator 220 may iteratively update entity scores for all terms extracted by the corpus receiver 210. For example, an initial entity score may be assigned or calculated for each of the terms based on a probability from the name probability source 130, then the entity scores may be updated based on the known entity database 132, and those entity scores may further be updated based on the historical context information 134. Accordingly, the probability calculator 220 enables the entity detector 110 to calculate a probability for an entity score that any term extracted from unstructured data of the corpus input 120 refers to an entity or an entity of interest (e.g., an entity that a particular party may be interested in, such as a suspect, witness, or accomplice of the legal example described above).

Referring to the legal example above, if a particular business or organization is under investigation, the probability calculator 220 may use a company directory and/or organization chart of the known entity database 132 to identify entities within the corpus input 120 that are to be questioned or investigated (i.e., entities of interest) regarding the legal matter. As such, when terms such as names, numbers, or titles from the known entity database 132 appear or do not appear within unstructured data of the corpus input 120 using the name probability source 130, the probability that the those terms refer to an entity of interest (e.g., a suspect, a witness, an accomplice, etc.) may be adjusted accordingly. For example, the probability calculator 220 may increase the probability that the term is an entity of interest when the term appears in the known entity database 132 and decrease the probability when the term does not appear in the known entity database 132. Furthermore, the probability calculator 220 may adjust the probability for a particular term based on location information (e.g., an instance of term that matches the name of a person at a particular location may indicate a higher probability or level of interest than a person at a different location from a subject investigation), organizational chart information (e.g., the term matches the name of an individual that reports to a particular entity under investigation), etc. In some examples, the probability calculator 220 may use the historical context information 134 to determine a specific date of interest, when a term (e.g., "Tuesday") that is less specific is identified in the corpus input 120. For example, the probability calculator 220 may increase the entity score for the term "Tuesday" when a following or previous Tuesday of a date of the document in the corpus input 120 mentioning Tuesday corresponds to an important date for the legal matter being investigated.

Furthermore, using the legal example, the probability calculator 220 may calculate/adjust a probability that a term refers to entities of interest (e.g., suspects, witnesses, accomplices, etc.) that are not a part of a business under investigation, and therefore do not exist within the known entity database 132 (i.e., a term for a detected entity does not exist in the known entity database 132). The historical context information 134 may provide that information through traffic analysis. For example, the historical context information 134 may provide or indicate that a member of the business is frequently mentioning or speaking with a particular individual. Accordingly, the probability calculator 220 may adjust the probability for a term for that individual accordingly. Furthermore, the probability calculator 220 may identify nicknames of entities of interest for an investigation from the historical context information 134 and update probabilities of terms based on the identified nicknames, though the particular entities of interest are not referred to by such names in the known entity database 132.

The example entity identifier 230 of FIG. 2 uses the probabilities and entity scores calculated by the probability calculator 220 to identify which terms extracted by the corpus receiver 210 from the corpus input 120 refer to an entity or entity of interest. In some examples, the entity identifier 230 may implement a threshold entity score (e.g., an entity score indicating 80% probability) that indicates whether or not a term refers to an entity. The entity identifier 230 may thus identify those terms with a probability that satisfies (e.g., reaches, exceeds, etc.) the threshold probability as referring to an entity. In some examples, the entity identifier 230 may identify a threshold entity score that refers to an entity of interest (or an entity that a particular party is seeking to identify, regardless of whether the party knows who the entity is or not). For example, the entity identifier 230 may indicate that terms having an entity score indicating at least 95% probability of referring to an entity are entities of interest. Accordingly, the entity identifier 230 may identify and distinguish which terms may be entities and the relevance of the entities (whether not the entities of interest) based on ranges of the entity scores calculated for the terms. The entity identifier 230 may provide such information to the entity indicator 240 to output the entity detection.

The example entity indicator 240 generates the entity detection output 140 of FIG. 1. The example entity indicator 240 may generate a list or table of entities and/or entities of interest identified in the corpus input 120 based on the indication of the entity identifier 230 (and probabilities/entity scores for terms of the corpus input 120). In some examples, the entity indicator 240 provides location information for where an entity or entity of interest can be found in the corpus input 120. For example, the entity indicator 240 may indicate which data file (e.g., which document, which audio recording, which video recording, which image) and the location of the term in the data file (e.g., line number, paragraph number, coordinates of an image, time information of audio or video, frame information of video, etc.). In some examples, the entity indicator 240 may provide relationship or association information between entities detected by the entity detector 110 of FIG. 2. For example, the entity indicator 240 may generate a graph indicating communications, working relationships, etc. between entities detected by the entity detector 110. In some examples, the entity indicator 240 may indicate such relationships in a list or table (e.g., using an "Associates" column).

Accordingly, the entity detector 110 of FIG. 2 may be used to detect entities within unstructured data within the corpus input 120 using a probabilistic approach in accordance with examples herein. As such, a party may use the entity detector 110 to detect any entities or entities of interest in the corpus input 120 regardless of whether the party has previous knowledge of the existence of the entity or entity of interest. Referring back to the legal example, an investigator or attorney may use the entity detector 110 to identify entities within unstructured electronic evidence that may be associated (e.g., as witnesses, as accomplices, as suspects, etc.) with a particular matter.

While an example manner of implementing the entity detector 110 of FIG. 1 is illustrated in FIG. 2, at least one of the elements, processes and/or devices illustrated in FIG. 2 may be combined, divided, re-arranged, omitted, eliminated and/or implemented in any other way. Further, the corpus receiver 210, the probability calculator 220, the entity identifier 230, the entity indicator 240, and/or, more generally, the example the entity detector 110 of FIG. 2 may be implemented by hardware and/or any combination of hardware and executable instructions (e.g., software and/or firmware). Thus, for example, any of the corpus receiver 210, the probability calculator 220, the entity identifier 230, the entity indicator 240, and/or, more generally, the example the entity detector 110 could be implemented by at least one of an analog or digital circuit, a logic circuit, a programmable processor, an application specific integrated circuit (ASIC), a programmable logic device (PLO) and/or a field programmable logic device (FPLD). When reading any of the apparatus or system claims of this patent to cover a purely software and/or firmware implementation, at least one of the corpus receiver 210, the probability calculator 220, the entity identifier 230, and/or the entity indicator 240 is/are hereby expressly defined to include a tangible machine readable storage device or storage disk such as a memory, a digital versatile disk (DVD), a compact disk (CD), a Blu-ray disk, etc. storing the executable instructions. Further still, the example entity detector 110 of FIG. 2 may include at least one element, process, and/or device in addition to, or instead of, those illustrated in FIG. 2, and/or may include more than one of any or all of the illustrated elements, processes and devices.

Figure 3:
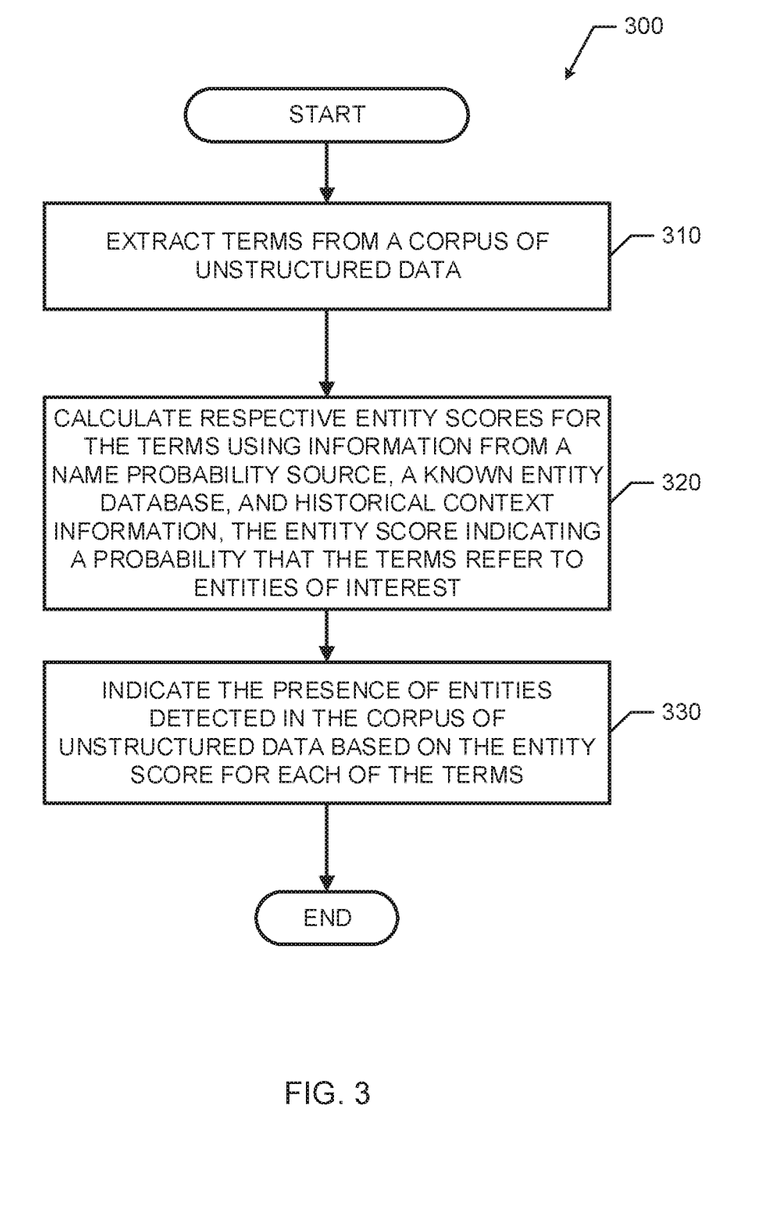
FIG. 3 is a flowchart representative of example machine readable instructions that may be executed to implement the entity detector of FIG. 2.
Figure 4:
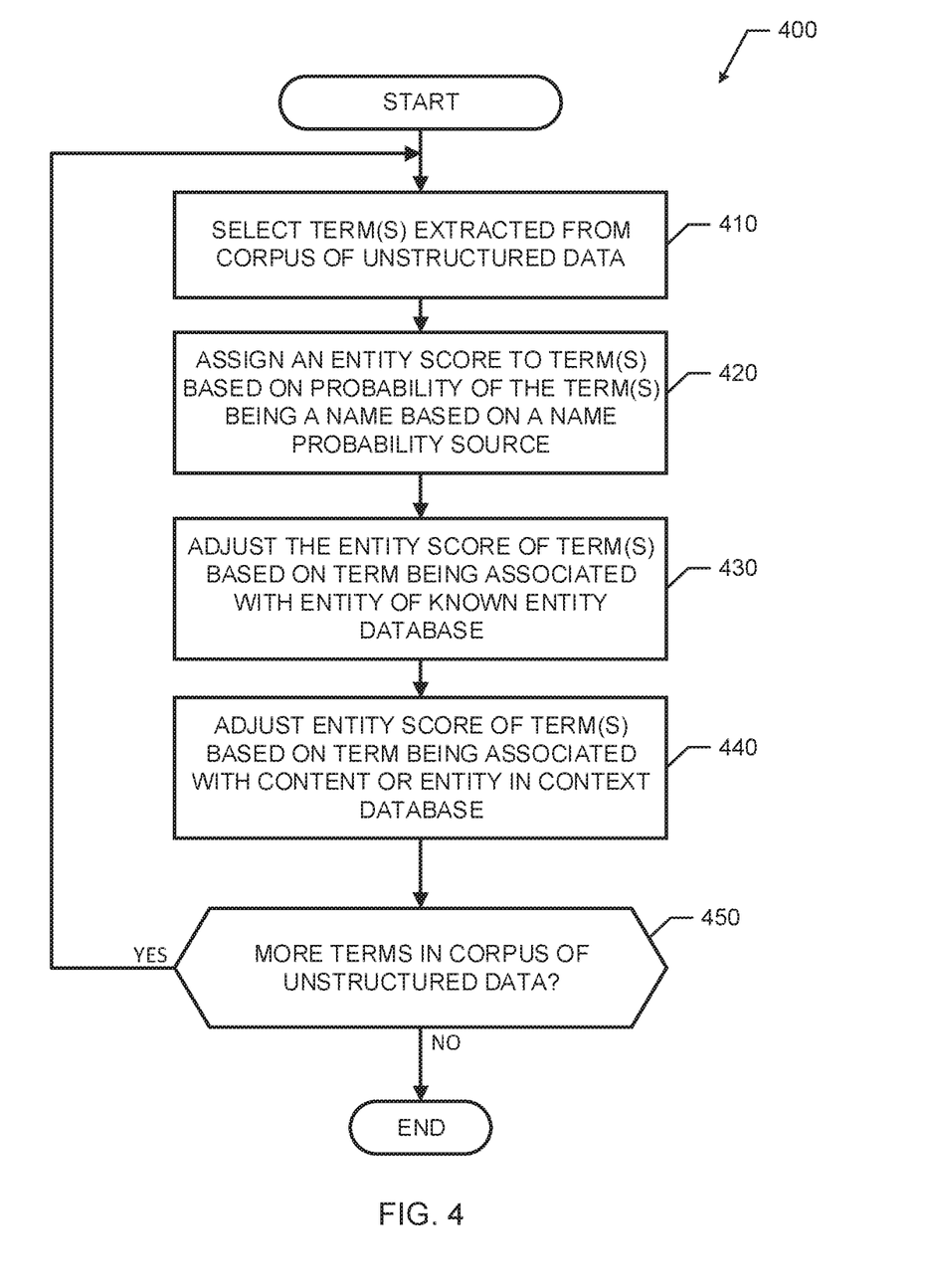
FIG. 4 is a flowchart representative of an example portion of the example machine readable instructions of FIG. 3 to implement the entity detector of FIG. 2.

Flowcharts representative of example machine readable instructions for implementing the entity detector 110 of FIG. 2 are shown in FIGS. 3 and 4. In this example, the machine readable instructions comprise program(s)/process(es) for execution by a processor such as the processor 512 shown in the example processor platform 500 discussed below in connection with FIG. 5. The program(s)/process(es) may be embodied in executable instructions (e.g., software) stored on a non-transitory machine readable storage medium such as a CD-ROM, a floppy disk, a hard drive, a digital versatile disk (DVD), a Blu-ray disk, or a memory associated with the processor 512, but the entire program/process and/or parts thereof could alternatively be executed by a device other than the processor 512 and/or embodied in firmware or dedicated hardware. Further, although the example program(s)/process(es) is/are described with reference to the flowcharts illustrated in FIGS. 3 and/or 4, many other methods of implementing the example entity detector 110 may alternatively be used. For example, the order of execution of the blocks may be changed, and/or some of the blocks described may be changed, eliminated, or combined.

The example process 300 of FIG. 3 begins with an initiation of the entity detector 110 (e.g., upon startup, upon instructions from a user, upon startup of a device implementing the entity detector 110 (e.g., the entity detection system 100), etc.). The example process 300 may be executed to detect entities in unstructured data using a probabilistic approach in accordance with examples herein. At block 310, the corpus receiver 210 extracts terms from a corpus of unstructured data (e.g., the corpus input 120 or unstructured data of the corpus input 120).

At block 320 of FIG. 3, the probability calculator 220 calculates respective entity scores for the terms using information from a name probability source, a known entity database, and historical context information. The example entity scores of block 320 indicate a probability that the respective terms refer to entities of interest. In some examples, block 320 or portions of block 320 may be iteratively executed for each term and/or for each probability calculation. At block 330, the entity indicator 240 indicates the presence of entities detected in the corpus of unstructured data based on the probability for each of the terms. In some examples, the entity indicator 240, at block 330, may provide additional information such as relationship or associations between detected entities in the corpus of unstructured data and/or location information within the corpus of unstructured data.

FIG. 4 is a flow diagram of an example process 400 that begins with an initiation of the entity detector 110 and/or the probability calculator 220. The example process 400 of FIG. 4 may be executed to implement block 320 of FIG. 3 and/or to implement the probability calculator 220 of FIG. 2. At block 410, the probability calculator 220 selects a term or terms extracted from the unstructured data.

At block 420, the probability calculator 220 assigns an entity score to the term(s) based on a probability of the term(s) being a name based on the name probability source 130. The example block 420 may be iteratively executed to assign and update/adjust the entity score for any database or source (e.g., a census database, language dictionaries, regional name databases, etc.) within the name probability source 130 that provides statistics for the term being associated with an entity. At block 430, the probability calculator 220 adjusts the entity score of the term(s) based on the term(s) being associated with an entity of the known entity database 132. The example block 430 may be iteratively executed to adjust the entity score based on information from any database or source (e.g., a directory, an organization chart, etc.) of the known entity database 132. At block 440, the probability calculator 220 adjusts the entity score of the term(s) based on the term(s) being associated with information from the historical context information 134. The example block 440 may be iteratively executed to adjust the entity score based on information from any database or information source (e.g., nickname table, traffic analysis map, etc.) of the historical context information 134.

At block 450, the probability calculator 220 determines whether there are more term(s) in the corpus of unstructured data to be analyzed. If more terms are to be analyzed, control returns to block 410. If there are no more terms to be analyzed, the example process 400 ends. In some examples, after the example process 400 ends, control advances to block 330 of FIG. 3.

As mentioned above, the example processes of FIGS. 3 and 4 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

As used herein, the term non-transitory machine readable medium is expressly defined to include any type of machine readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 5:
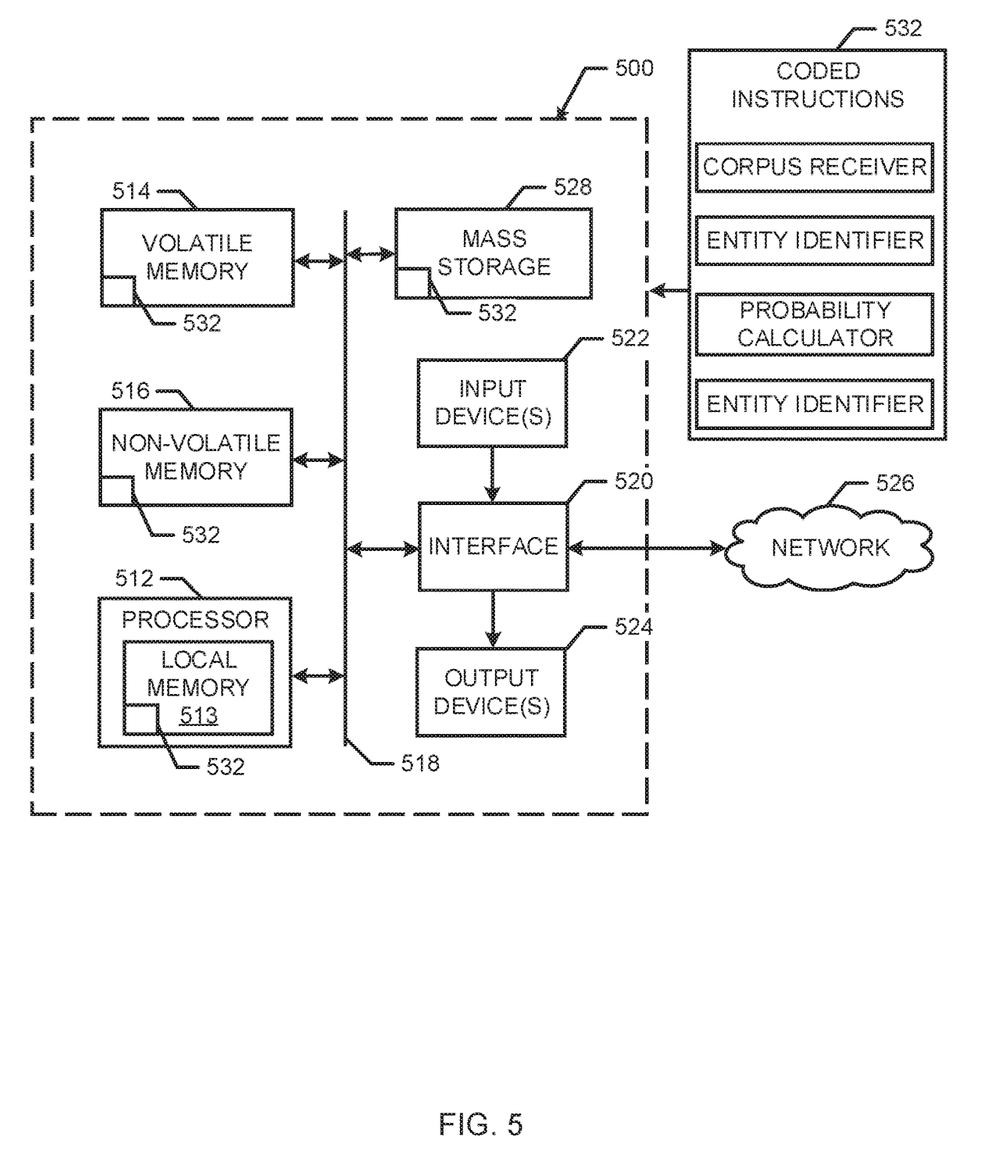
FIG. 5 is a block diagram of an example processor platform capable of executing the instructions of FIGS. 3 and/or 4 to implement the entity detector of FIG. 2.

FIG. 5 is a block diagram of an example processor platform 500 capable of executing the instructions of FIGS. 3 and/or 4 to implement the entity detector 110 of FIG. 2. The example processor platform 500 may be or may be included in any type of apparatus, such as a server, a personal computer, a mobile device (e.g., a cell phone, a smart phone, a tablet, etc.), or any other type of computing device.

The processor platform 500 of the illustrated example of FIG. 5 includes a processor 512. The processor 512 of the illustrated example is hardware. For example, the processor 512 can be implemented by at least one integrated circuit, logic circuit, microprocessor or controller from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory, a persistent, byte-addressable memory accessible via a memory fabric and/or any other desired type of non-volatile memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a peripheral component interconnect (PCI) express interface.

In the illustrated example, at least one input device 522 is connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, and/or a voice recognition system.

At least one output device 524 is also connected to the interface circuit 520 of the illustrated example. The output device(s) 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, may include a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc,).

The processor platform 500 of the illustrated example also includes at least one mass storage device 528 for storing executable instructions (e.g., software) and/or data. Examples of such mass storage device(s) 528 include floppy disk drives, hard drive disks, compact disk drives, Blu-ray disk drives, RAID systems, and digital versatile disk (DVD) drives.

The coded instructions 532 of FIGS. 3 and/or 4 may be stored in the mass storage device 528, in the local memory 513 in the volatile memory 514, in the non-volatile memory 516, and/or on a removable tangible machine readable storage medium such as a CD or DVD.

From the foregoing, it will be appreciated that the above disclosed methods, apparatus and articles of manufacture enable for the detection of entities within a corpus of unstructured data using a probabilistic approach. The example entity detection uses a name probability source, known entity database, and historical context information to determine whether an entity and/or an entity of interest exists within the unstructured data. Furthermore, examples herein provide for accurate detection of the entities by accounting for nicknames, number formats, communication habits, etc. Using the examples herein, entities, whether previously known to exist or not, may be identified in the unstructured data. Accordingly, such entities may be detected, identified, and associated with a particular matter even if the entity was not previous known to be associated with the matter.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    extracting terms from a corpus of unstructured data, the terms including a first term;
    calculating a first entity score that scores the first term based on a frequency of occurrence of the first term in a name probability source and to indicate a probability that the first term refers to an entity of interest, the first term being extracted from the corpus of unstructured data, including:
        applying a first weighting factor to data received from the name probability source; and
        applying a second weighting factor to the probability that the first term refers to an entity of interest;
    determining whether the first term is found in a known entity database that includes a plurality of known entity names;
    adjusting the first entity score based on whether the first term is found in the known entity database, wherein the probability that the first term refers to the entity of interest is increased if the first term is found in the known entity database;
    determining that the entity of interest has been detected in the corpus of unstructured data based on a comparison of the first entity score to a threshold entity score; and
    indicating the entity of interest has been detected in the corpus of unstructured data.

2. The method as defined in claim 1, wherein the name probability source indicates a first frequency that the first term refers to a name in a first language or first locality and a second frequency that the first term refers to the name in a second language or second locality, and wherein determining the frequency of occurrence of the first term in the name probability source comprises determining that the first frequency should be used.

3. The method as defined in claim 1, wherein the known entity database comprises a directory of known entities or an organization structure of known entities.

4. The method as defined in claim 1, further comprising:
    from the corpus of unstructured data or outside the corpus of unstructured data;
        determining that the first term is an alternate term for the entity of interest based on historical context information; and
        adjusting the first entity score based on determining that the first term is the alternate term.

5. The method as defined in claim 1, wherein determining whether the first term is found in the known entity database comprises:
    determining whether a portion of the first term matches an identifier of an entity in the known entity database.

6. The method as defined in claim 1, further comprising:
    obtaining historical context information from the corpus of unstructured data or outside the corpus of unstructured data;
    determining that the first term is associated with the entity of interest based on content of the historical context information; and
    adjusting the first entity score based on the determination that the first term is associated with the entity of interest.

7. The method as defined in claim 6, wherein the first term does not match a term for an entity in the known entity database.

8. A non-transitory machine readable storage medium comprising instructions that, when executed, cause a machine to:

extract a term from a corpus of unstructured data;
calculate an entity score that scores the term based on a frequency of occurrence of the term in a name probability source and to indicate a probability that the term is a name or non-name, the term being extracted from the corpus of unstructured data, wherein the instructions when executed further cause the machine to:
  apply a first weighting factor to data received from the name probability source; and
  apply a second weighting factor to the probability that the term is a name or non-name;
determine whether the term is found in a known entity database of known entities associated with a matter;
adjust the entity score based on whether the term is found in the known entity database;
obtain historical context information associated with the matter;
adjust the entity score based on information from the historical context information; and
indicate a presence of an entity in the corpus of unstructured data based on the entity score.

9. The non-transitory machine readable medium of claim 8, wherein the instructions when executed, further cause the machine to:
indicate the entity in the corpus of unstructured data is an entity of interest based on the entity score, the entity of interest comprising an entity associated with the matter.

10. The non-transitory machine readable medium of claim 8, wherein the entity in the corpus of unstructured data is not referred to in the known entity database.

11. An apparatus comprising:
a processor to:
extract terms from unstructured data, the terms including a first term;
calculate a first entity score that scores the first term based on a frequency of occurrence of the first term in a name probability source, the first term being extracted from the unstructured data, and wherein the processor is further to:
  apply a first weighting factor to data received from the name probability source; and
  apply a second weighting factor to the probability that the first term refers to an entity of interest;
determine whether a portion of the first term matches content in a known entity database that includes a plurality of known entity names;
adjust the first entity score based on whether a portion of the first term matches content in the known entity database;
identify an entity in the unstructured data based on the first entity score; and
indicate a presence of the identified entity in the unstructured data.

12. The apparatus of claim 11, wherein the processor is to use a threshold entity score to determine whether the first term refers to the identified entity, wherein the identified entity is not in the known entity database.

13. The apparatus of claim 11, wherein the processor is to use a threshold entity score to determine whether the first term refers to the identified entity, the identified entity being an entity of interest associated with a matter.

14. The apparatus of claim 13, wherein the entity of interest is not in the known entity database.

15. The apparatus of claim 11, wherein the processor is to indicate relationship information between the identified entity and another entity detected in the unstructured data.

16. The apparatus of claim 11, wherein the processor is to:
obtain historical context information associated with a matter; and
adjust the first entity score based on the historical context information, and wherein the name probability source comprises a probability that the terms are a name or non-name and the known entity database comprises known entities associated with the matter.

17. The apparatus of claim 11, wherein the processor is to:
obtain historical context information;
determine that the first term is an alternate term for the identified entity based on the historical context information; and
adjust the first entity score based on the determination that the first term is the alternate term for the identified entity.

18. The apparatus of claim 17, wherein to determine that the first term is an alternate term for the identified entity, the processor is to:
determine that the first term is a nickname for the identified entity based on text from the historical context information.

19. The apparatus of claim 11, wherein the processor is to:
obtain historical context information;
identify, from the historical context information, one or more communications between the identified entity and another entity;
generate a social graph that associates the identified entity and the another entity based on the one or more communications; and
adjust the first entity score based on the social graph.

20. The apparatus of claim 11, wherein the processor is to:
obtain historical context information;
identify, from the historical context information, a contextual term;
determine that the contextual term relates to a first entity of interest; and
determine that the contextual term refers to a second entity of interest based on the determination that the contextual term relates to the first entity of interest.

* * * * *